(12) United States Patent
Kohler et al.

(10) Patent No.: US 9,297,629 B2
(45) Date of Patent: Mar. 29, 2016

(54) CONTOUR STANDARD HAVING A ROTATIONALLY SYMMETRICAL CALIBRATION REGION, USE OF THE STANDARD AND METHOD FOR CALIBRATING AND/OR MONITORING A CONTOUR MEASURING INSTRUMENT

(75) Inventors: Thomas Kohler, Seeburg (DE); Gerhard Wolf, Schontal (DE)

(73) Assignee: Carl Mahr Holding GmbH, Gottingen (DE)

( * ) Notice: Subject to any disclaimer, the term of this patent is extended or adjusted under 35 U.S.C. 154(b) by 42 days.

(21) Appl. No.: 14/113,067

(22) PCT Filed: Dec. 23, 2011

(86) PCT No.: PCT/EP2011/074004
§ 371 (c)(1),
(2), (4) Date: Dec. 13, 2013

(87) PCT Pub. No.: WO2012/149987
PCT Pub. Date: Nov. 8, 2012

(65) Prior Publication Data
US 2014/0144203 A1    May 29, 2014

(30) Foreign Application Priority Data

May 2, 2011 (DE) .......................... 10 2011 050 036

(51) Int. Cl.
*G01B 5/20*     (2006.01)
*G01B 3/14*     (2006.01)
*G01B 3/30*     (2006.01)
*G01B 21/04*    (2006.01)

(52) U.S. Cl.
CPC .. *G01B 5/20* (2013.01); *G01B 3/14* (2013.01); *G01B 3/30* (2013.01); *G01B 21/042* (2013.01)

(58) Field of Classification Search
CPC ............ G01B 21/20; G01B 5/20; G01B 3/14; G01B 3/30
See application file for complete search history.

(56) References Cited

U.S. PATENT DOCUMENTS

| 4,539,753 A | 9/1985 | Fitzpatrick |
| 4,899,793 A * | 2/1990 | Snyder ................. B23Q 35/102 142/49 |
| 5,269,067 A | 12/1993 | Waeldele |

FOREIGN PATENT DOCUMENTS

FR    2201453 A1    4/1974

* cited by examiner

*Primary Examiner* — Paul West
(74) *Attorney, Agent, or Firm* — Emch, Schaffer, Schaub & Porcello Co., L.P.A.

(57) ABSTRACT

The invention is a contour standard, which consists of a body having a rotationally symmetrical calibration region. The rotationally symmetrical calibration region encompasses a plurality of non-cylindrical axial sections, which can be concave, convex, by forming a predefined angle as radial projection or as radial depression. The calibration region has at least one measuring section, which runs parallel to the longitudinal axis of the body and which provides for axial calibration variables, as well as radial calibration variables. These calibration variables are compared with the sensed values to the calibration of a measuring instrument and the measuring instrument is adjusted based on the basis of the determined deviation. Due to the rotationally symmetrical calibration region, the contour standard is suitable both for the calibration of touch contour measuring instruments and also for the calibration of contour measuring instruments, which measure optically.

13 Claims, 3 Drawing Sheets

Figure 1:
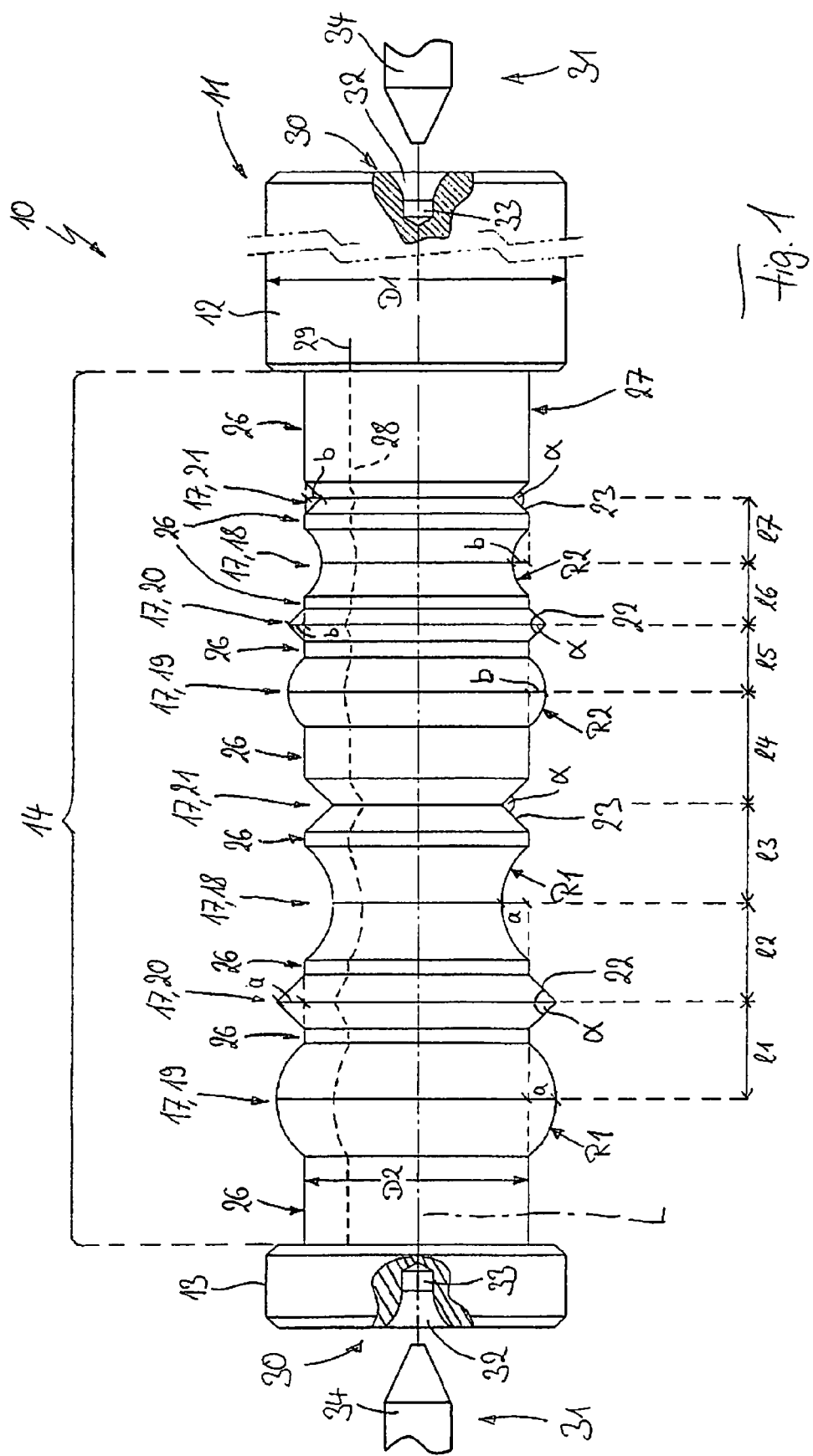

CONTOUR STANDARD HAVING A ROTATIONALLY SYMMETRICAL CALIBRATION REGION, USE OF THE STANDARD AND METHOD FOR CALIBRATING AND/OR MONITORING A CONTOUR MEASURING INSTRUMENT

CROSS REFERENCE TO RELATED APPLICATION

The present patent application is based upon and claims the benefit of German patent application no. 102011 05036.7; filed May 2, 2011, and PCT application no. PCT/EP2011/074004, filed Dec. 23, 2011.

BACKGROUND OF THE INVENTION

The invention relates to a contour standard, which can be used for calibrating a contour measuring instrument, as well as to a method for calibrating a contour measuring instrument.

The publication "Grundlagen der Rückführung von Koordinatenmessgeräten" (*Foundations for Resetting Coordinate Measuring Instruments*), Otto Kusko, Michal Neugebauer, PTB-Mitteilungen 117 (2007), issue 4, page 354 describes different standards and the use thereof. The standard is a test body, which serves the purpose of calibrating measuring instruments for a user and which represents a possibility, which can be used easily to pass the SI unit length to different measuring instruments in a calibrated form. Depending on the use for different measuring instruments, different test bodies can be considered thereby. The contour standard thereby refers to a method, which is described in VDI 2629 for contour measuring instruments. The desired measuring inaccuracy is thereby one micrometer for distances and approx. 0.1 degrees for angle elements. The contour standard is embodied as a plate, which encompasses a thickness of approximately 5 mm. The defined and calibrated comparison contour, which encompasses circular arcs and angles, is defined at one of the narrow sides. These contours are embodied both as depressions and also as protrusions. In response to the calibration of a contour measuring instrument, this contour is sensed and is calibrated based on the known lengths and angles of the contour of the contour measuring instrument.

In said article by PTB, a contour transfer standard is furthermore described as an alternative. It encompasses a solid ball and a prism, which are held by a support. Two precision balls made of ceramic and one Zerorud® prism, which are arranged on a support made of invar, are present in the case of the illustrated exemplary embodiment.

So-called magnification standards, for example a wave standard or a flick, are also used for restoring one-dimensional coordinate measuring instruments. These are standards having a specifically embodied form deviation. The signal transfer chain is to be examined and calibrated in the measuring instrument by means of these magnification standards. In the case of the wave standard, provision is thereby made for one or a plurality of harmonic waves on the outer side, which serve the purpose of examining and calibrating the level of the amplitudes in the signal processing of the measuring instrument. In contrast, roundness deviations are evaluated in the case of the flick. According to DE 10 2005 042 278 B4, such harmonic waves can also be provided on the jacket surface of a cylinder.

SUMMARY OF THE INVENTION

So-called magnification standards, for example a wave standard or a flick, are also used for restoring one-dimensional coordinate measuring instruments. These are standards having a specifically embodied form deviation. The signal transfer chain is to be examined and calibrated in the measuring instrument by means of these magnification standards. In the case of the wave standard, provision is thereby made for one or a plurality of harmonic waves on the outer side, which serve the purpose of examining and calibrating the level of the amplitudes in the signal processing of the measuring instrument. In contrast, roundness deviations are evaluated in the case of the flick. According to DE 10 2005 042 278 B4, such harmonic waves can also be provided on the jacket surface of a cylinder.

The contour standard, which is currently used for the calibration of contour measuring instruments, is subject to a certain wear on the narrow side in the case of sensed deviations, so that the service life of the contour standard is limited. It also turned out that the contour standard, which is currently used, is not suitable for optical contour measuring instruments. Such optical contour measuring instruments operate in the transmitted light process, for example. This process requires the alignment of the narrow side with the calibration contour of the contour standard exactly parallel to the direction of propagation of the light beams. A "tilting" of the contour standard plate creates undesirable interferences in the measurement, the light beams strike the narrow side, resulting in the fact that the calibration contour cannot be measured accurately. The error-free alignment of the plate is virtually impossible in practice and is at least uneconomical, because an evaluation criterion, when the narrow side is aligned exactly parallel to the beam path, is not provided. Such an evaluation criterion, however, would be necessary for the calibration of a measuring instrument. This could be remedied by embodying the plate-shaped contour standard for the optical contour measuring instruments to be considerably thinner, so that the thickness of the contour standard becomes negligibly small in the optical path. It turned out, however, that the contour standard becomes too unstable through this and in turn leads to uncertainties in response to the calibration.

Advantageous embodiments of the invention follow from the dependent patent claims as well as from the description. The invention is explained in the description by means of preferred embodiments. The description is limited to essential features of the invention. The drawing should be used as a supplement.

IN THE DRAWINGS

Figure 2:
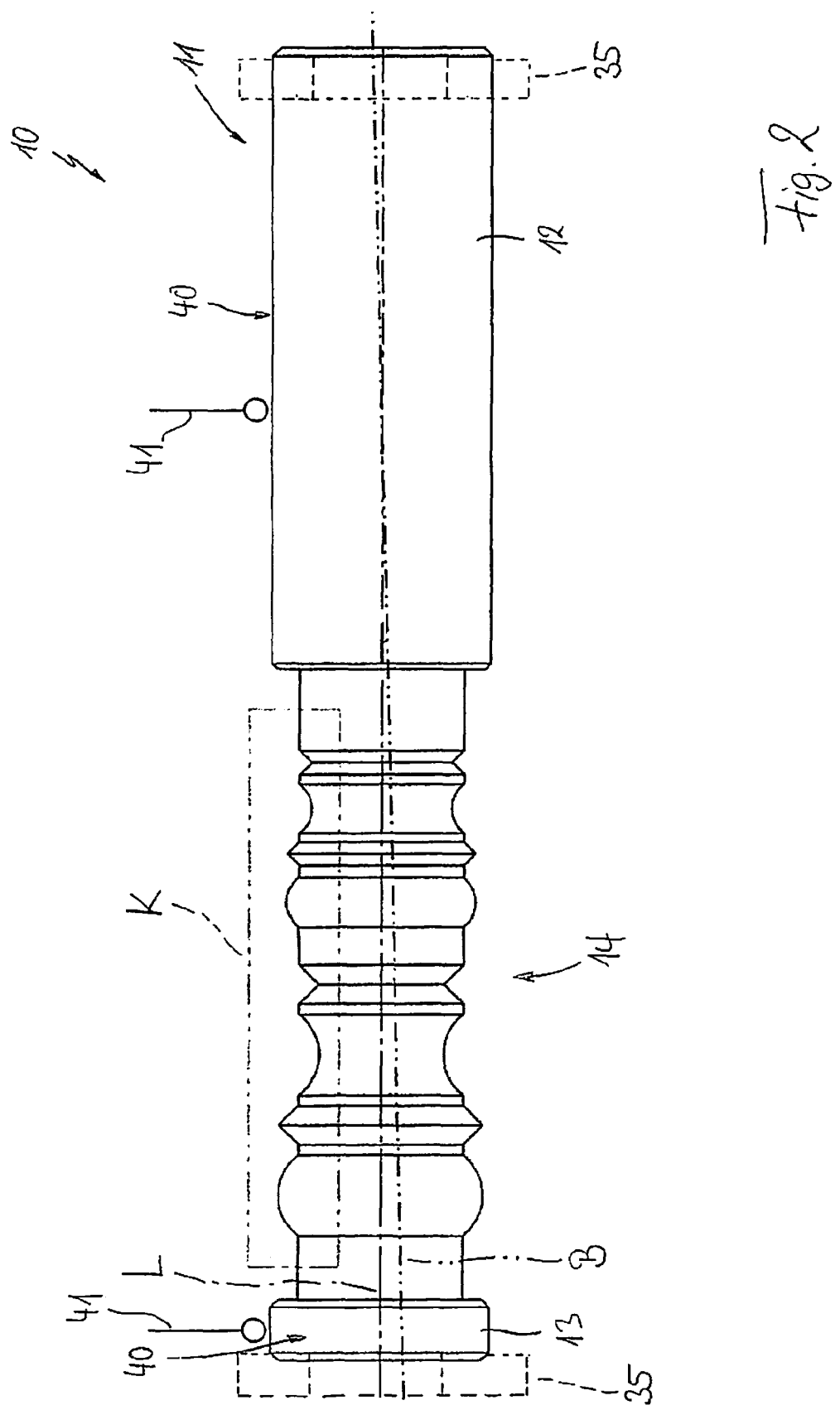
Figure 3:
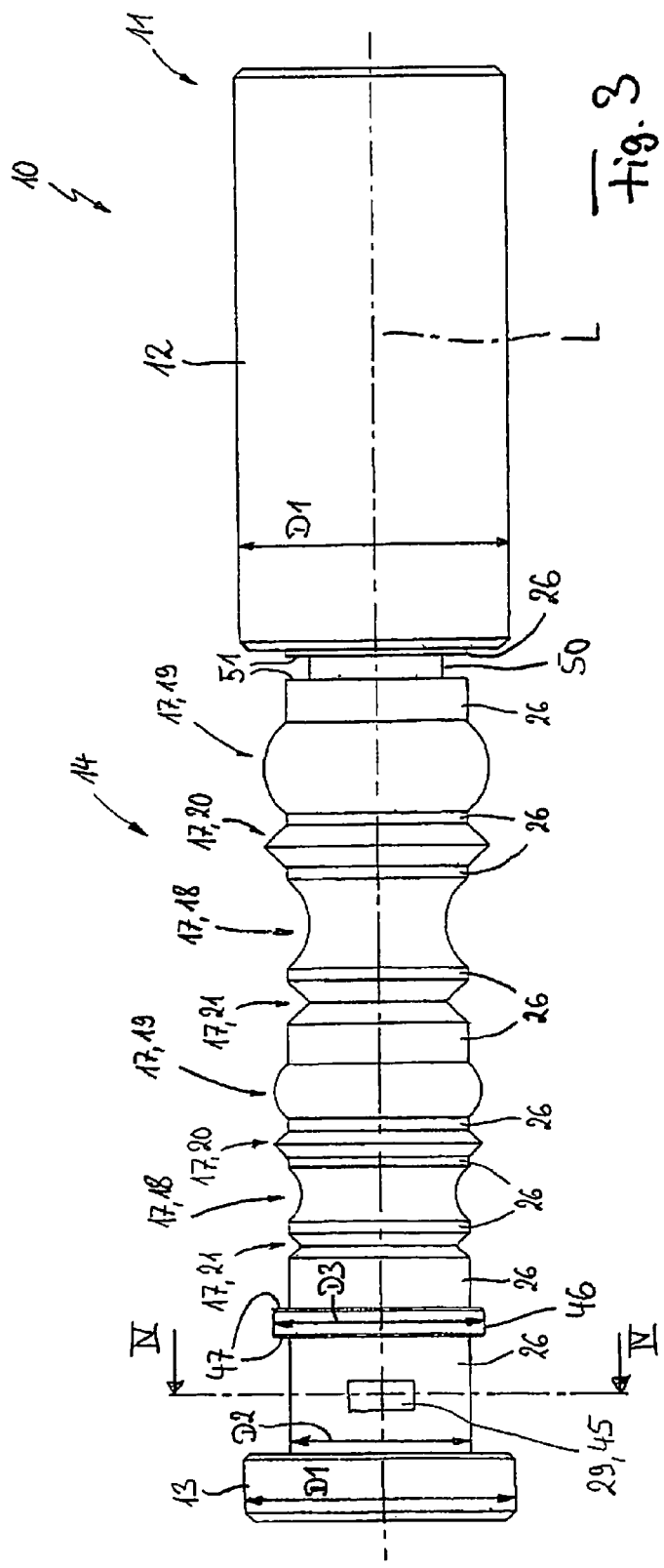
Figure 4:
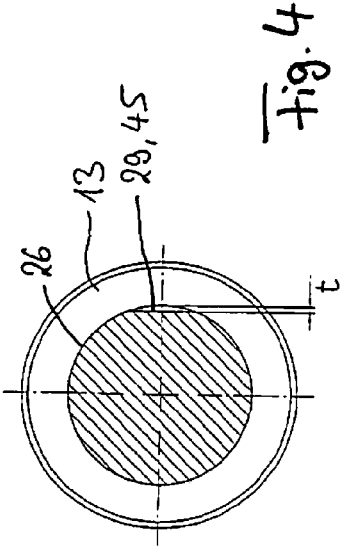

FIG. 1 shows a schematic side view of an exemplary embodiment of a contour standard, FIG. 2 shows a modified exemplary embodiment of the contour standard from FIG. 1 in a schematic side view as well as a schematic diagram of the aligning of the contour standard relative to a reference axis, FIG. 3 shows a schematic side view of a further exemplary embodiment of a contour standard, and FIG. 4 shows a cross section through the contour standard from FIG. 3 according to the sectional line IV-IV.

DETAILED DESCRIPTION OF THE INVENTION

It can thus be considered to be the task of the instant invention to provide for a contour standard, which is suitable both for the calibration of touch contour measuring instruments and also for the calibration of contour measuring instruments, which measure optically.

This task is solved by means of a contour standard having the features of patent claim 1. The contour standard consists of a body, which is rotationally symmetrical at least in one calibration region and which is produced in particular without joints or connecting locations made of a homogenous material and which is produced in one piece, so to say. Preferably, the body is made of steel, for example stainless steel. A metal-cutting CNC process can be used for the production, so as to obtain the required accuracy. In the alternative, it is also possible to embody the body for uses in calibration as a cast part with lower accuracy requirements, which provides for a production, which is considerably more cost-efficient. Preferably, the body is hardened so as to minimize wear.

The body encompasses a rotationally symmetrical calibration region, which has a plurality of non-cylindrical axial sections. Geometry elements, which make it possible to determine different sizes, are formed by means of said axial sections. Such size determinations can be made by means of a geometry element in a non-cylindrical axial section, e.g. a radius, and/or by joining a plurality of geometry elements, e.g. angular dimensions, distances, diameters. Said axial sections comprise at least one concave section, one convex section and one prismatic section. The concave section represents a concave depression in the jacket surface. The convex section forms a convex protrusion. Preferably, the concave section and/or convex section are embodied so as to be curved and without edges. The prismatic section encompasses a triangular depression, viewed in longitudinal section through the body, or a triangular radial projection, viewed in longitudinal section. In a manner of speaking, a prism-shaped projection or a prism-shaped depression comprising a predefined angle is formed through this. One calibrated measuring section is present in axial direction along the jacket surface in the calibration region of the body or a plurality of calibrated measuring sections is present spaced apart in circumferential direction. The calibrated measuring sections are contours, which are measured explicitly at the test body. For measuring purposes, these measuring sections can then be measured by means of a contour measuring instrument, which is to be calibrated, whereby the measuring results are compared with the actual values along the measuring section and the calibration of the contour measuring instrument is thus made possible.

Due to the rotationally symmetrical form of the calibration region with the measuring section, said calibration region can be aligned with its longitudinal axis along a reference axis very easily and can be used both for the touch contour measurement and also for the optical contour measurement in the transmitted light process. Due to the rotationally symmetrical form, the calibration region of the body is always aligned correctly relative to the direction of the light beams in the beam path. Through this, the calibration of optical contour measuring instruments can also be carried out easily and economically. This is not possible with the currently known plate-shaped contour standards. The described form of the jacket surface in the calibration region makes it possible to calibrate the contour measuring instrument with reference to lengths in radial direction and in axial direction. Calibrations are thus possible in two coordinate directions.

It is advantageous when the adjacent, non-cylindrical axial sections are connected to one another by means of a cylindrical connecting section in each case. Viewed in axial direction, the beginning as well as the end of a non-cylindrical axial section is clearly defined through this. The cylindrical connecting sections can also be used for reference forming purposes, for example. For example, the center of a circle can be determined and its distance to the outer or jacket surface of the cylindrical connecting section can be determined by measuring a circular arc. This distance can serve as measure for calibrating or monitoring, respectively, the contour measuring instrument.

It is furthermore advantageous when, viewed in axial direction, the contour of the jacket surface of the body in the concave section and/or in the convex section, has the course of a circular arc. Viewed in axial direction, the contour of the concave section or of the convex section, respectively, thus follows a circular arc having a predefined radius. It is simple to calibrate the contour measuring instrument by means of such circular arcs. In addition, circular arc-shaped contours are often measured in practice, so that the calibration corresponds to a frequent practical use, so that conclusions to the accuracy of the contour measuring instrument can be drawn from the calibration in the case of practical tasks.

Adjoining the calibration region, the body encompasses a substantially cylindrical end piece in each case at both axial ends. A cylindrical circumferential surface or cylindrical jacket surface, respectively, of the end pieces can thereby be used for aligning the body. By measuring the position of the circumferential surfaces at a plurality of locations, which are spaced apart in circumferential direction and axially, for example at the two circumferential surfaces of the end piece, the longitudinal axis can be made to correspond exactly with a reference axis in a very simple manner. Due to the rotationally symmetrical form of the calibration region, which defines the calibration contour, this type of alignment is sufficient and the calibration of the contour measuring instrument can be started.

The diameter of the two end pieces is preferably larger than the maximum diameter of the calibration region between the two end pieces. The contour, which serves for the calibration, is thus protected from being damaged in the calibration region, when the body is placed onto a surface. It is thereby also possible to provide for a radial projection at the end pieces at one or a plurality of locations, so that rolling away is prevented or at least limited when placing the body onto an inclined surface. In the case of an exemplary embodiment, the two diameters of the cylindrical end piece have the same size.

At one location, the body can have a marking, which has a defined position relative to the at least one calibrated measuring section, so that the user can very easily find and use the calibrated measuring section in the calibration region.

At both of its axial ends, the body in each case encompasses a holding means for holding the body in a holding direction in the case of a preferred embodiment. For example, a center hole, which is introduced coaxially to the longitudinal axis of the body, serves as holding means. The center hole tapers towards its inner closed end. The tapering can be conical, for example, or can preferably be formed by a convex circumferential hole surface. Due to a tapering center hole, the body can in each case be accommodated very easily via an assigned centering pin of a holding device and can be aligned relative to a reference axis.

FIG. 1 shows a contour standard 10, which consists of a body 11. The body 11 is made of a homogenous material, preferably chromium-containing steel, by means of a metal-cutting numerically-controlled process, such as turning, for example. As an alternative to this, the body 11 could also be embodied as a cast part, when lower requirements are made on the contour standard for calibrating a contour measuring instrument.

Between an axial first end piece 12 and a second end piece 13, which is provided on the axially opposite end of the body 11, the body 11 encompasses a calibration region 14. The body 11 is embodied in a rotationally symmetrical manner at least in the calibration region 14. In the case of a preferred exemplary embodiment according to FIG. 1, the body 11 is embodied so as to be completely rotationally symmetrical.

The two end pieces 12, 13 are contoured cylindrically and both of them encompass a first diameter D1, which is larger than the maximum diameter of the body 11 in the calibration region 14. Through this, the contour of the body 11 in the calibration region 14 is protected against being damaged, when the body 11 is placed onto a surface. The body rests on the surface only with its two end pieces 12, 13.

Provision is made in the calibration region 14 for a plurality of non-cylindrical axial sections 17 having a defined contour for calibrating the contour measuring instrument. In a manner of speaking, each non-cylindrical axial section 17 forms a geometry element, for example a depression, which is circular arc-shaped or triangular in longitudinal section, a projection, which is circular arc-shaped or triangular in longitudinal section, or the like. The non-cylindrical axial sections 17, for example, comprise at least one concave section 18, at least one convex section 19, at least one radially protruding prismatic section 20, as well as at least one returning prismatic section 21, which is embodied as radial depression. Viewed in longitudinal section through the body 11, the prismatic sections 20, 21 are embodied as triangular radial projections 22 or as triangular depressions 23, respectively. The tip of the radial projection 22 or of the radial depression 23, respectively, encompasses a predefined calibration angle $\alpha$ of 90°, for example. It goes without saying that, as a modification of the illustrated exemplary embodiment, calibration angles having a different size can also be predefined at different radial projections 22 or radial depressions 23, respectively.

The contour of the concave sections 18 as well as of the convex sections 19 runs in axial direction along the longitudinal axis L of the body 11 at a predefined first radius R1 or a predefined second radius R2, respectively. In the case of the exemplary embodiment, a convex section 19 and a concave section 18 are present in each case, the contour of which follows the circular arc having the first radius R1 and having the second radius R2.

In the case of the exemplary embodiment described herein, the non-cylindrical axial sections 17 are in each case connected to one another by means of a cylindrical connecting section 26 in the calibration region 14. Provision is furthermore made on the end side for connecting sections 26, which in each case directly adjoin one of the two end pieces 12, 13. The non-cylindrical sections 17 define radial calibration variables a, b relative to the second diameter D2, whereby the diameter of the axial sections 17 is larger or smaller by the radial calibration variable a, b. The amount and the number of the radial calibration variables a, b can vary. In the case of the exemplary embodiment, one concave section 18, one convex section 19 and one prismatic section 20 in each case have the same radial calibration variable a or b.

In addition, the calibration region 14 defines axial calibration variables Ii with i=1 to n. In the case of the exemplary embodiment, the number n of the axial calibration variables is smaller by 1 than the number of the non-cylindrical axial sections 17.

A measuring section 28, the measuring values of which are assigned to the contour standard 10, is measured along the longitudinal axis L in the calibration region 14 or on the jacket surface 27 of the boy 11, respectively, in the calibration region 14. Preferably, a plurality of such measuring sections 28 are present in the calibration region 14 so as to be spaced apart from one another in circumferential direction, for example every 45° or every 90°. The measuring values for each measuring section 28 are assigned to the contour standard 10 and are enclosed for the user in the form of documentation, for example. The user can determine the position of the at least one measuring section 28 exactly via at least one marking 29 on the body 11. In the case of the exemplary embodiment described herein, a line and/or a groove or another optical marking 29 are attached to the first end piece 12, whereby the axial measuring section 28 runs in circumferential direction at the height of the marking 29, for example. One marking 29 is sufficient so as to more accurately define the position of all of the measuring sections 28, which are possibly present in the calibration region 14. It goes without saying that all of the measuring sections 28 can also be marked by means of a separate marking 29 for more easily locating the measuring sections.

At its two axial ends, the body 11 in each case encompasses a holding means 30, so that the body 11 or the contour standard 10, respectively, can be meld in a holding device 31 of the contour measuring instrument. In the exemplary embodiment, a center hole 32, which tapers inwards from the axial end, serves as holding means 33. In the case of the exemplary embodiment, the center hole 32 tapers along a curved hole wall, the curvature of which is determined by a radius, up to an inner cylindrical end region 33. As an alternative to this, the tapering of the center hole 32 could also be embodied conically. Two holing pins 34, which are in each case assigned to a center hole 31 and which expand conically, starting at a tip, belong to the holding device 31. The holding pins 34 can be inserted axially into the respective assigned center hole 32 and can accommodate the contour standard 10. An exact positioning and a simple alignment of the body 11 is possible through this along a reference axis B.

At least one of the two end pieces 12 can encompass an axial length, which corresponds approximately to the axial length of the calibration region 14, which can be seen by means of FIG. 2.

A modified form of the two end pieces 12, 13 is illustrated in FIG. 2, whereby they are not embodied in a rotationally symmetrical manner. The end pieces 12, 13 encompass one or a plurality of radial projections, so as to embody the end pieces 12, 13 so as to be non-round at least in this area. It can be prevented through this that the body 11, which has been placed onto an inclined surface, rolls away inadvertently and that the exact contour of the calibration region 14 is damaged when falling down. Viewed in cross section, polygonal regions or disks 35 can be embodied, for example, at the two end pieces 12, 13, as is illustrated by dashed lines in FIG. 2.

The alignment of the contour standard 10 is illustrated in a highly diagrammatic manner in FIG. 2. In response to the alignment, the circumferential surfaces 40 of the two end pieces 12, 13 serve as alignment surfaces for aligning the body 11. By sensing the circumferential surfaces 40, for example by means of touch styluses 41 at a plurality of locations in circumferential direction about the longitudinal axis L, deviations between the position of the longitudinal axis L of the body 11 and a reference axis B can be determined. The alignment of the body 11 can then be corrected and can be made to conform to the reference axis B. Such an alignment can take place very quickly and easily. Due to the calibration region 14, which is embodied so as to be rotationally symmetrical, the calibration contour K, which includes the measuring section 28, can be adjusted very easily by rotating the body 11 into the desired rotary position. The contour standard 10 can also be used very easily for contour measuring instruments, which measure optically. In every rotary position, the curved calibration region 14 has the same contour, viewed in the direction of the light beam. On its uppermost contour line, it has a line-shaped vertex, which forms the calibration contour K. This form of the calibration region 14 does not cause any optical interferences, which lead to measuring inaccuracies. The light beams, which strike the body 11 next to the calibration contour K, are reflected away from the receiver and/or are also absorbed as a function of the surface and do not interfere with the optical measuring. In response to the calibration of a touch measuring instrument, the body 11 can encompass a plurality of calibrated measuring sections 28, which are spaced apart in circumferential direction, so that the contour standard 10 can also still be used when one of the measuring sections 28 is subject to wear due to frequent use and no longer ensures reliable calibration results.

For calibrating a contour measuring instrument, the contour standard is clamped into the holding device 31 of the contour measuring instrument and the longitudinal axis L is aligned in relation to a reference axis D. The calibration contour K is subsequently sensed by means of touch or optically. The measuring variables of the calibration contour K, which are detected by means of the sensing, are compared with the actual values of the measuring section 28, which are detected by means of the contour standard 10 along the measured measuring section 28. In the event of a deviation between the measured values and the actual values, which lies outside of an admissible tolerance range for the contour measuring instrument, the contour measuring instrument can be adjusted, so as to reduce the deviation. The process is repeated until the sensed measuring values correspond to the actual contour values along the measuring section 28 or at least lie within the admissible tolerance range.

A modified exemplary embodiment of a contour standard 10 is illustrated in FIG. 3. The basic setup corresponds to the above-described contour standard 10 according to FIGS. 1 and 2, so that reference can be made to the above description. Differences as compared with the above-described exemplary embodiments will be explained below.

In the case of the exemplary embodiment shown in FIG. 3, the marking 29 on the body 11 for locating the at least one measuring section 28 is embodied as a so-called flick 45. The flick 45 is provided at the cylindrical connecting section 26, which connects directly to one of the two end pieces 12, 13 and preferably to the second end piece 13 with a smaller axial length. The flick 45 is embodied by means of a flat portion at the cylindrical connecting section 26, as can in particular be seen in FIG. 4. As compared with the cylindrical jacket surface of the cylindrical connecting section 26, the flat portion has a maximum distance t of approximately 1 mm to the jacket surface, in the center, viewed in circumferential direction. The flick 25 is formed by means of a rectangular flat surface. It can be sensed in a highly accurate manner by sensing in circumferential direction about the longitudinal axis L, so that an accurate position determination of the at least one measuring section 28 is possible.

A further difference of the exemplary embodiment shown in FIG. 3 as compared with the exemplary embodiment according to FIGS. 1 and 2 is that a cylindrical ring 46 is arranged, following the cylindrical connecting section 26, which follows the second end piece 13. The cylindrical ring 46 encompasses a third diameter D3, which is larger than the second diameter D2 of the cylindrical connecting sections 26 and which is smaller than the first diameter D1 of the two end pieces 12, 13. A cylindrical connecting section 26 having the second diameter D2 in each case follows the cylindrical ring 46 on both sides. A ring-shaped edge 47, which runs radially to the longitudinal axis L of the body 11, is thus in each case formed at the cylindrical ring 46 in the transition to each of the two cylindrical connecting sections 26.

The two edges 47 at the cylindrical ring 46 serve the purpose of touching the ring 46 from both axial sides, so as to determine the axial length of the ring 46. The touching is thereby performed at the edges 47, which project radially relative to the respective adjoining surface of the cylindrical connecting section 26. The cylindrical ring 46 moreover serves for calibrating in response to the measuring of an axial length at a radial projection.

In a manner of speaking, the contour standard 10 illustrated in FIG. 3 also encompasses a counter piece to the cylindrical ring 46. Following the cylindrical connecting section 26, which follows the first end piece 12, provision is made for a ring-shaped groove 50, which encompasses a design having a rectangular or square cross section. A cylindrical connecting section 26 in each case follows the groove 50 axially on both sides. Two groove edges 51, which run radially to the longitudinal axis L of the body 11, are formed by means of the groove 50. The axial length of the groove 50 can be determined by touching via the two groove edges 51. In the case of the contour standard 10, the groove edges 51 and the groove 50 moreover serve the purpose of carrying out the calibration for the measuring of an axial length of a groove or of a groove-like depression, respectively.

Aside from the described differences, the exemplary embodiment illustrated in FIGS. 3 and 4 can be embodied like the embodiments of the contour standard 10 illustrated in FIGS. 1 and 2.

The invention relates to a contour standard 10, which consists of a body 11 having a rotationally symmetrical calibration region 14. In the rotationally symmetrical calibration region 14, the body 11 encompasses a plurality of non-cylindrical axial sections 17, which can be embodied so as to be concave, convex, by forming a predefined angle α as radial projection 22 or as radial depression 23. Provision is made along the calibration region 14 for at least one measuring section 28, which runs parallel to the longitudinal axis L of the body 11 and which provides for axial calibration variables $l_i$, with $i=1$ to $n$, as well as radial calibration variables a, b. The values of these calibration variables a, b, $l_i$ can be compared with the sensed values in response to the calibration of a measuring instrument and the measuring instrument can be adjusted on the basis of the determined deviation. Due to the rotationally symmetrical calibration region 14, the contour standard 10 is suitable both for the calibration of touch contour measuring instruments and also for the calibration of contour measuring instruments, which measure optically.

LIST OF REFERENCE NUMERALS 10 contour standard
11 body
12 first end piece
13 second end piece
14 calibration region
17 non-cylindrical axial section
18 concave section
19 convex section
20 projecting prismatic section
21 returning prismatic section
22 radial projection
23 radial depression
26 connecting section
27 jacket surface
28 measuring section
29 marking
30 holding means
31 holding device 32 center hole
33 end region of the center hole
34 holding pin
35 disc
40 circumferential surface
41 stylus
45 flick
46 cylindrical ring
47 edge
50 groove
α calibration angle
a, b radial calibration variable
D1 first diameter
D2 second diameter
D3 third diameter
B reference axis
K calibration contour
L longitudinal axis
li axial calibration variable
R1 first radius
R2 second radius
t distance The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method for calibrating and/or monitoring a contour measuring instrument, comprising:
    providing a contour standard (10) of a rotationally symmetrical body (11) having a calibration region (14), which encompasses a plurality of non-cylindrical axial sections (17), which include at least one axial concave section (18), which is embodied so as to be concave, at least one axial convex section (19), which is embodied so as to be convex, and at least one axial prismatic section (20, 21) having a triangular depression (23), viewed in longitudinal section, or having a triangular radial projection (22), viewed in longitudinal section
    aligning the rotationally symmetrical body (11) with its longitudinal axis (L) along a reference axis (B),
    sensing a calibration contour (K) in the calibration region (14) along an axial measuring section (28),
    comparing the detected measuring values to the calibrated actual values of the measuring section (28),
    adjusting the contour measuring instrument, so that the measuring values lie within an admissible tolerance range as compared with the actual values of the measuring section (28).

2. The method according to claim 1, further comprising connecting adjacent non-cylindrical axial sections (17) by means of a cylindrical connecting section (26).

3. The method according to claim 1, further comprising positioning a jacket surface (27) of the calibration region (14) in the concave section (18) and/or in the convex section (19) along a circular arc, viewed in the direction of the longitudinal axis (L) of the body (11).

4. The method according to claim 1, further comprising providing a cylindrical end piece (12, 13) at both axial ends of the body (11).

5. The method according to claim 4, further comprising aligning the body (11) in the direction of a predefined reference axis (B) by utilizing a cylindrical circumferential surface of the two cylindrical end pieces (12, 13) which functions as an alignment surface.

6. The method according to claim 4, characterized in that the two cylindrical end pieces (12, 13) have a diameter (D1) that is larger than the diameter of all of the axial sections (17, 26) in the calibration region (14).

7. The method according to claim 1, further comprising providing at least one calibrated axial measuring section (28) in the calibration region (14) of the body (11).

8. The method according to claim 7, further comprising identifying the position of the at least one calibrated measuring section (28) by means of a marking (29) on the body (11).

9. The method according to claim 1, characterized in that making the body (11) is done with a homogenous material, free from connecting locations or joints.

10. The contour standard according to claim 1, further comprising forming the body (11) of steel, in particular of chromium-containing steel.

11. The method according to claim 1, further comprising forming a reference surface with cylindrical connecting sections.

12. The method according to claim 1, characterized in that measuring determinations are made within a geometry element in a non-cylindrical axial section (17) and/or by joining a plurality of geometry elements.

13. The method according to claim 1, further comprising holding the body (11) in a holding device (31) in each case at both axial ends by a holding means (30).

* * * * *